(12) United States Patent
Hoelzl

(10) Patent No.: US 10,288,164 B2
(45) Date of Patent: May 14, 2019

(54) PLANETARY GEAR TRAIN FOR A WIND TURBINE

(71) Applicant: Miba Gleitlager Austria GmbH, Laakirchen (AT)

(72) Inventor: Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 149 days.

(21) Appl. No.: 15/518,552

(22) PCT Filed: Oct. 14, 2015

(86) PCT No.: PCT/AT2015/050255
§ 371 (c)(1),
(2) Date: Apr. 12, 2017

(87) PCT Pub. No.: WO2016/058018
PCT Pub. Date: Apr. 21, 2016

(65) Prior Publication Data
US 2017/0219088 A1    Aug. 3, 2017

(30) Foreign Application Priority Data

Oct. 16, 2014  (AT) .................................. 50743/2014

(51) Int. Cl.
*F16H 57/08* (2006.01)
*F03D 15/00* (2016.01)
(Continued)

(52) U.S. Cl.
CPC ........... *F16H 57/082* (2013.01); *F03D 15/00* (2016.05); *F16C 17/02* (2013.01); *F16C 35/00* (2013.01);
(Continued)

(58) Field of Classification Search
CPC .......... F16H 57/082; F16H 1/28; F16C 35/00; F16C 17/02; F03D 15/00
See application file for complete search history.

(56) References Cited

U.S. PATENT DOCUMENTS 440,717 A    11/1890  Mower
3,178,967 A   4/1965  Fritsch
(Continued)

FOREIGN PATENT DOCUMENTS

AT         228 584 B     7/1963
CN       101493117 A     7/2009
(Continued)

OTHER PUBLICATIONS

International Search Report of PCT/AT2015/050255, dated Jan. 28, 2016.

*Primary Examiner* — Stacey A Fluhart
(74) *Attorney, Agent, or Firm* — Collard & Roe, P.C.

(57) ABSTRACT

The invention relates to a planetary gear train (1) for a wind turbine, comprising: a sun gear; an annular gear (13); a planet carrier (9) with multiple bearing seats (12); multiple planetary gear axles (8); multiple radial sliding bearings (23) for mounting the planet gear axles (8) in the planet carrier (9); multiple planet gears (5) which are each mounted in the planet carrier (9) by means of the planet gear axles (8). The planet carrier (9) has a parting plane (17) in the region of each of the bearing seats (12), wherein a first half shell (18) of one of the bearing seats (12) is formed by the planet carrier (9) and a second half shell (19) of one of the bearing seats (12) is formed in each case by a bearing cap (20).

8 Claims, 3 Drawing Sheets

(51) Int. Cl.
   *F16H 1/28* (2006.01)
   *F16C 35/00* (2006.01)
   *F16C 17/02* (2006.01)
   *F16C 17/10* (2006.01)
   *F16C 33/12* (2006.01)

(52) U.S. Cl.
   CPC ............ *F16H 1/28* (2013.01); *F05B 2240/50* (2013.01); *F05B 2260/40311* (2013.01); *F16C 17/10* (2013.01); *F16C 33/122* (2013.01); *F16C 2360/31* (2013.01); *F16C 2361/61* (2013.01); *F16H 2057/085* (2013.01); *Y02E 10/722* (2013.01)

(56) References Cited

U.S. PATENT DOCUMENTS

| | | | |
|---|---|---|---|
| 4,775,250 A * | 10/1988 | Stewart | F16H 57/082 384/626 |
| 4,776,237 A | 10/1988 | Premiski et al. | |
| 5,928,105 A * | 7/1999 | Taha | F16H 57/082 475/331 |
| 8,414,448 B2 | 4/2013 | Madge et al. | |
| 9,086,122 B2 | 7/2015 | Franke et al. | |
| 9,419,495 B2 | 8/2016 | Kari | |
| 2009/0190870 A1 | 7/2009 | Chen et al. | |
| 2013/0178326 A1* | 7/2013 | Franke | F16H 57/082 475/331 |
| 2013/0324352 A1* | 12/2013 | Nomura | F16H 57/082 475/331 |
| 2014/0378261 A1* | 12/2014 | Kari | F16H 1/28 475/149 |
| 2015/0323057 A1* | 11/2015 | Kim | F16H 57/0479 475/159 |
| 2016/0084104 A1* | 3/2016 | Sheridan | F01D 15/12 416/170 R |
| 2016/0290440 A1* | 10/2016 | Chhour | B64C 13/28 |
| 2017/0219087 A1* | 8/2017 | Herr | B25F 5/001 |

FOREIGN PATENT DOCUMENTS

| | | |
|---|---|---|
| CN | 102966702 A | 3/2013 |
| DE | 10 2010 017 464 A1 | 12/2011 |
| DE | 10 2010 040 654 A1 | 3/2012 |
| EP | 0 255 571 A2 | 2/1988 |
| EP | 2 647 881 A1 | 10/2013 |
| FR | 553 430 A | 5/1923 |
| SU | 1 036 981 A1 | 8/1983 |
| SU | 1 170 210 A2 | 7/1985 |
| WO | 2013/106878 A1 | 7/2013 |

* cited by examiner

PLANETARY GEAR TRAIN FOR A WIND TURBINE

CROSS REFERENCE TO RELATED APPLICATIONS

This application is the National Stage of PCT/AT2015/050255 filed on Oct. 14, 2015, which claims priority under 35 U.S.C. § 119 of Austrian Application No. A 50743/2014 filed on Oct. 16, 2014, the disclosure of which is incorporated by reference. The international application under PCT article 21(2) was not published in English.

The invention relates to a planetary gear train and a wind turbine provided with the planetary gear train.

A generic planetary gear train is known from WO2013/106878A1 with the same applicant. Here at least one sliding bearing is arranged between a planetary axle and the planetary carrier, wherein the planetary gear is connected in a non-rotational manner to the planetary axle.

The underlying objective of the present invention is to create an improved planetary gear train which is easy to assemble and/or maintain.

Said objective of the invention is achieved by the planetary gear train described in this document and the wind turbine equipped with the latter.

According to the invention a planetary gear train for a wind turbine is provided which comprises the following components: a sun gear, an annular gear, a planetary carrier comprising a first bearing accommodating section and a second bearing accommodating section, in which bearing accommodating sections a plurality of bearing seats are formed respectively, a plurality of planetary gear axles, a plurality of radial sliding bearings for supporting the planetary gear axles in the planetary carrier, wherein each of the planetary gear axles are mounted respectively in one of the bearing seats of the first bearing accommodating section and in one of the bearing seats of the second bearing accommodating section, a plurality of planetary gears, which are mounted respectively by the planetary gear axles in the planetary carrier, wherein the planetary gears are in engagement both with the sun gear and also with the annular gear. The planetary carrier has a parting plane in the region of the bearing seats, wherein a first half shell of one of the bearing seats is formed by the planetary carrier and a second half shell of one of the bearing seats is formed respectively by a bearing cap.

An advantage of this design is that during the assembly of the planetary gear train the planetary gear axle together with the planetary gear can be placed easily in the bearing seat of the planetary carrier provided for this and can be secured afterwards by the bearing cap. In this way the planetary gear axle can be removed in radial direction of the planetary carrier, which results in easier handling particularly with large planetary gear trains, as for manipulating the planetary gear axle a lifting tool, such as a crane, can be used. These advantages are also provided when maintaining the planetary gear train, as it is simpler to take apart the gear for maintenance purposes.

Furthermore, it can be advantageous that one of the bearing caps is designed such that it extends over one of the bearing seats of the first bearing accommodating section and the respectively associated bearing seat of the second bearing accommodating section. It is an advantage here that a planetary gear axle or a planetary gear can be secured by only one bearing cap on the planetary carrier. The bearing cap can thus have a high degree of stability. Furthermore; the bearing cap can thus be secured easily and rapidly to the planetary carrier or detached from the latter. Furthermore, by using the smallest number of components the overview can be improved for the assembly or maintenance of the planetary gear train.

Furthermore, it is possible that one of the bearing caps comprises a recess, through which one of the planetary gears passes at least partly. It is an advantage here that the bearing cap can be designed such that it covers the inner parts of the planetary carrier, wherein only one portion of the planetary gear in engagement with the annular gear projects out of the planetary carrier or the bearing cap. In this way it is possible that the planetary carrier forms a compact unit with the bearing cap which can effectively absorb the bearing forces that arise.

Furthermore, it is possible that one of the radial sliding bearings is designed as a bearing bush, in particular as a multi-layered sliding bearing. It is an advantage in this case that multi-layered sliding bearings can have a structure which provides good support for the planetary gear axle.

In one development it is possible that the bearing bush is mounted securely in one of the bearing seats and an inner casing surface of the bearing bush is designed to accommodate a relative movement between the bearing bush and one of the planetary gear axles. It is an advantage here that in this way the bearing bush is mounted securely in the planetary carrier. The relative movement between the planetary gear axle and planetary carrier is transmitted on the inner casing surface of the bearing bush. In this way it is possible that the forces transmitted by the planetary gear act as far as possible on a specific circumferential area of the bearing bush.

Alternatively, one of the radial sliding bearings is designed in the form of a divided sliding bearing half shell. It is an advantage here that with a divided sliding bearing half shell the maintenance and assembly of the planetary gear can be performed easily. Furthermore, different materials can be used for example for the two sliding bearing half shells, whereby it is possible that materials with particularly good sliding properties or strength can be used to cover local load peaks.

According to one development it is possible that one of the planetary gear axles is designed in one piece with one of the planetary gears. In this way it is possible for example in series production to use the smallest possible number of individual parts in the planetary gear train. Furthermore, in this way the quality of the gear can be improved, as the concentricity of the planetary gear can be improved relative to the bearings on the planetary gear axle.

Furthermore, it can be an advantage that one of the bearing caps is connected by a plurality of connecting elements to the planetary carrier. It is an advantage here that the forces on the bearing cap can thus be introduced evenly into the planetary carrier, whereby as far as possible no deformation is caused by the pressure on the bearing cap. Such connecting elements can be screws for forming a screw connection for example.

Furthermore, it is possible for axial sliding bearings to be arranged between the end faces of one of the planetary gears and the planetary carrier. An advantage of this is that in this way the axial forces introduced into a planetary gear can be transferred to the planetary carrier and can be absorbed by the latter.

For a better understanding of the invention the latter is explained in more detail with reference to the following Figures.

In a much simplified, schematic representation:

Figure 1:
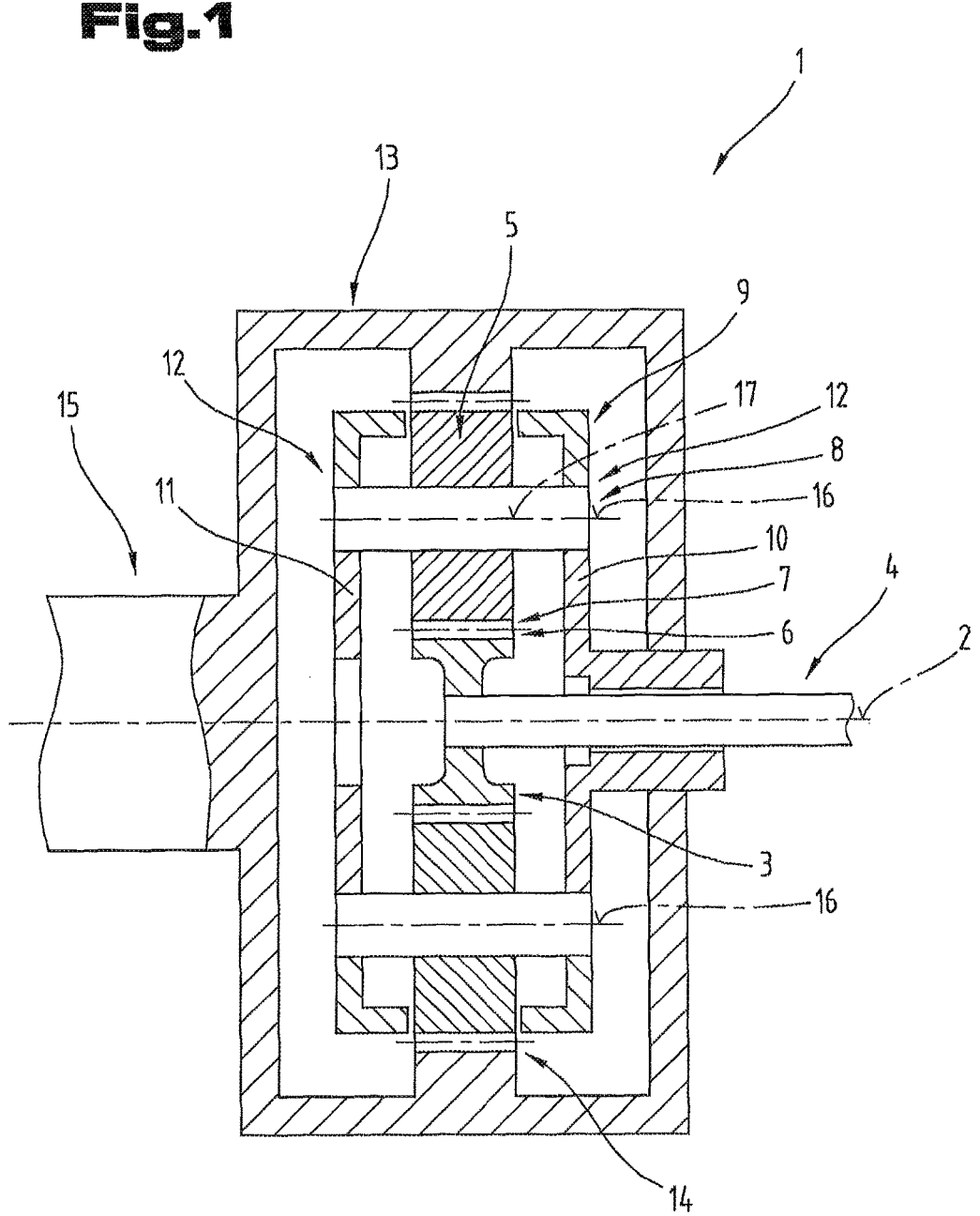
FIG. 1 shows a planetary gear train in a cross-sectional view according to a cross-section along a central line.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a planetary gear train 1 in a cross-sectional view according to a cross-section along a central line 2. The view according to FIG. 1 provides a general explanation of the structure of the planetary gear train and a view of the parts fitted into a planetary gear train.

It is known that wind turbines consist of a tower at the upper end of which a gondola is arranged, in which the rotor is mounted with the rotor blades. Said rotor is operatively connected by the planetary gear train 1 to a generator, which is also located in the gondola, wherein by means of the planetary gear train 1 the low speed of the rotor is translated into a higher speed of the generator rotor. As such embodiments of wind turbines are already found in the prior art, reference is made at this point to the relevant literature.

The planetary gear train 1 comprises a sun gear 3, which is movably coupled to a shaft 4 which leads to the generator rotor. The sun gear 3 is surrounded by a plurality of planetary gears 5, for example two, preferably three or four. Both the sun gear 3 and the planetary gears 5 have outerlying spur gear teeth 6, 7 which are in meshing engagement with one another, wherein said spur gear teeth 6, 7 are shown schematically in FIG. 1.

The planetary gears 5 are mounted by means of a planetary gear axle 8 in the planetary carrier 9, wherein in the planetary carrier 9 a first bearing accommodating section 10 and a second bearing accommodating section 11 are provided in which bearing seats 12 are formed respectively for accommodating the planetary gear axle 8.

An annular gear 13 is arranged surrounding the planetary gears 5, which annular gear has an inner toothing 14 which is in meshing engagement with the spur gear toothing 7 of the planetary gears 5. The annular gear 13 is movably coupled to a rotor shaft 15 of the rotor of the wind turbine. The spur gear teeth 6, 7 or the inner toothing 14 can be in the form of a straight toothing, an oblique toothing or a double oblique toothing.

As such planetary gear trains 1 are already known in principle from the prior art, for example from the aforementioned document cited as the prior art, no further explanations are necessary at this point.

It should be noted that in the following the singular is used when referring to the planetary gear 5. Of course, in the preferred embodiment all of the planetary gears 5 are designed according to the invention.

Figure 2:
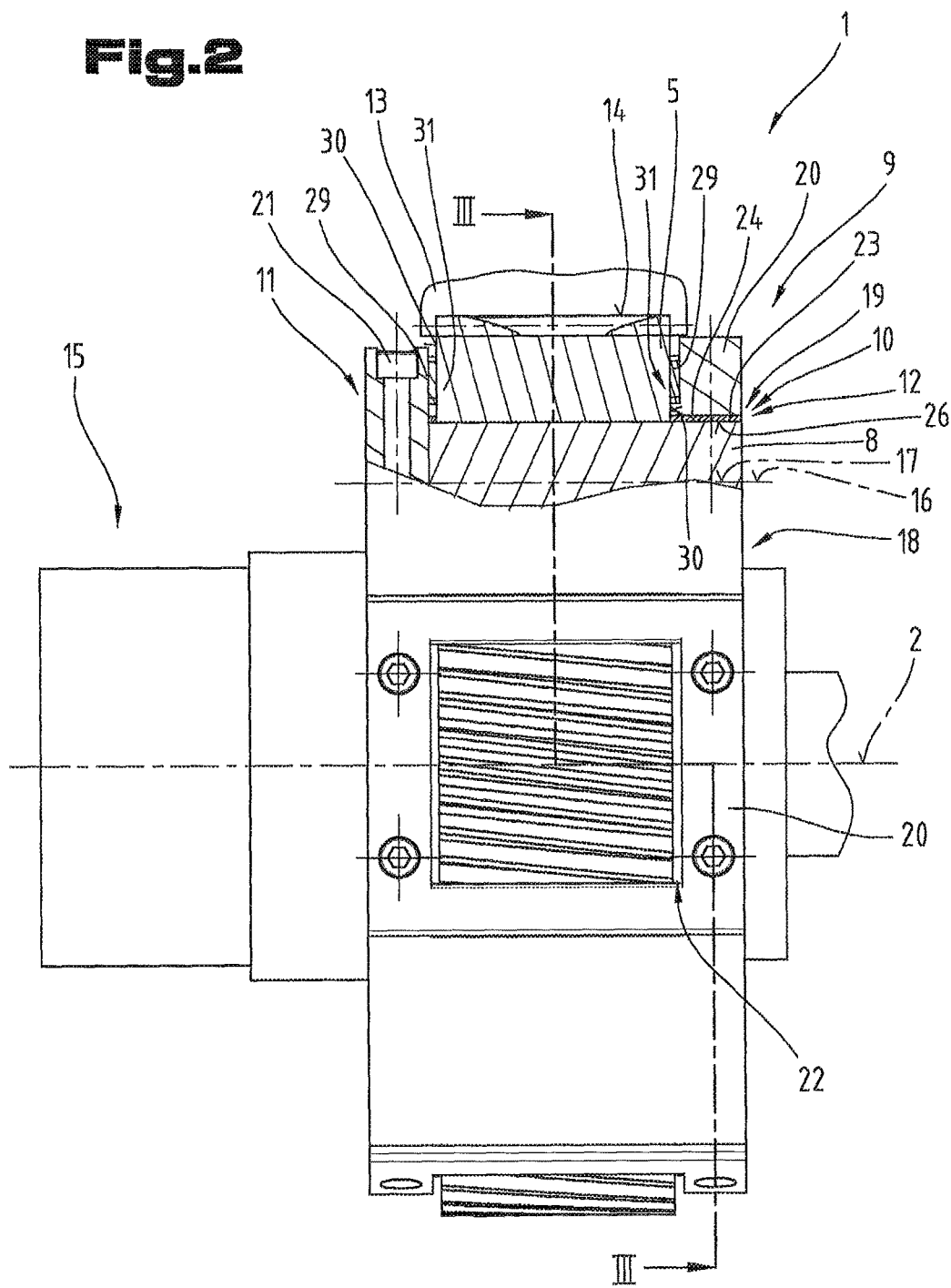
FIG. 2 shows a further embodiment of a planetary gear train with a partial cross-section.
Figure 3:
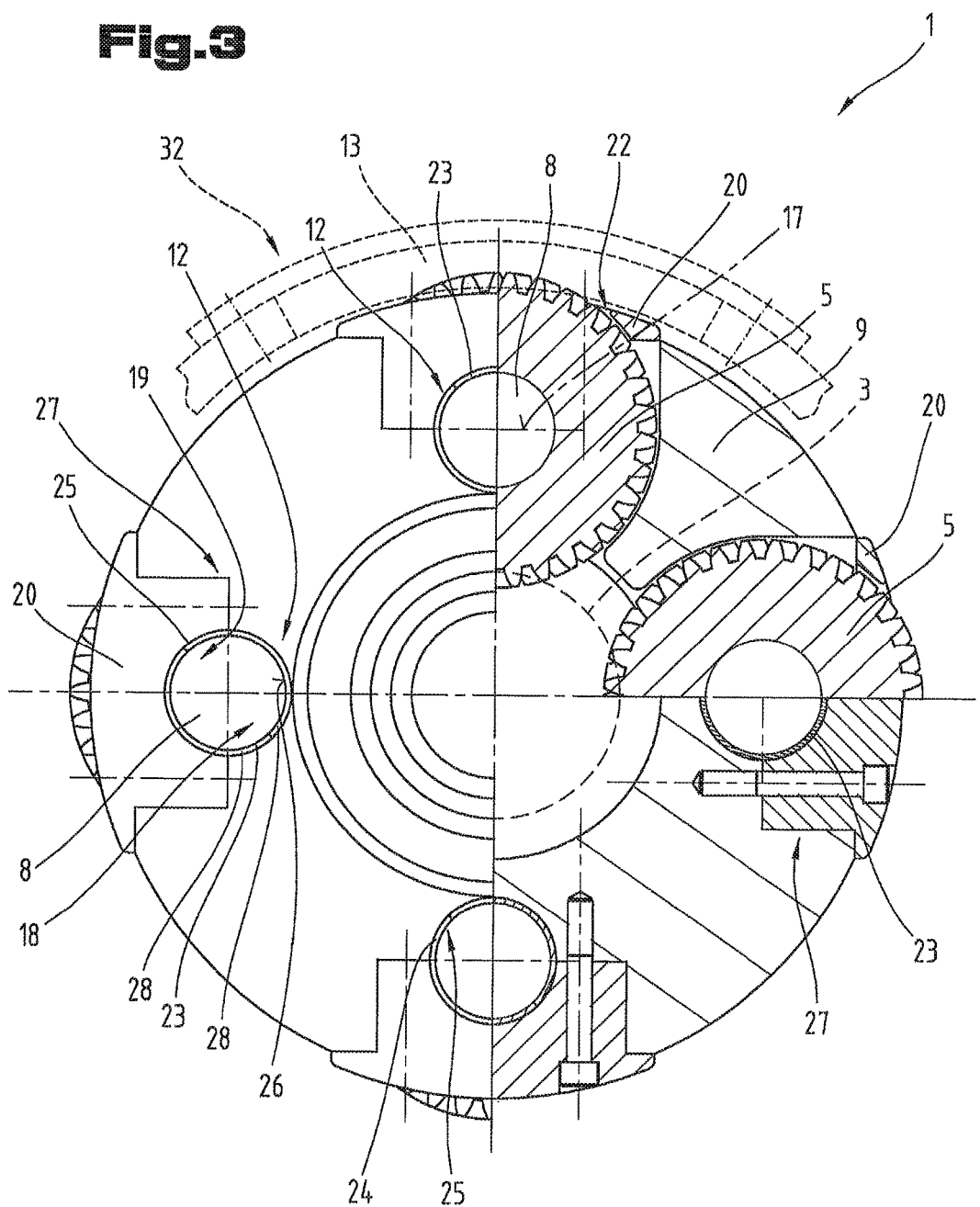
FIG. 3 shows a planetary gear train in a half-section according to the sectional line III-III of FIG. 2.

In FIGS. 2 and 3 a further and in itself independent embodiment of the planetary gear train 1 is shown, wherein again the same reference numerals and component names have been used for the same parts as in the preceding FIG. 1. To avoid unnecessary repetition, reference is made to the detailed description of the preceding FIG. 1.

FIG. 2 shows a further example embodiment of the planetary gear train 1 in a side view similar to FIG. 1, wherein the planetary carrier 9 is shown partly in cross-section, to show the bearing of the planetary gear axle 8 on the planetary carrier 9 and the structure of the planetary carrier 9.

FIG. 3 shows the planetary gear train 1 in a front view, wherein the left half of the planetary gear train 1 is not shown in cross-section. The right half of the planetary gear train 1 is shown in cross-section along the sectional line of FIG. 2.

The further structure of the planetary gear train 1 is described with reference to an overview of FIGS. 2 and 3.

As shown in FIG. 2 it is possible for the planetary gear axle 8 to be coupled to the planetary gear 5 and mounted on both sides in the planetary carrier 9. The connection between the planetary gear axle 8 and planetary gear 5 can be formed for example by a press-fit, by welding and the like.

Alternatively, the planetary gear 5 and the planetary gear axle 8 are designed in one piece and are for example made from a cast piece, the external contour of which has been subsequently processed or in which the toothing has been formed by mechanical processing.

As shown in the cross-sectional view of FIG. 2, the planetary carrier 9 comprises in the region of the central line 16 of the planetary gear axle 8 a parting plane 17, by means of which both the bearing seat 12 of the first bearing accommodating section 10 and also the bearing seat 12 of the second bearing accommodating section 11 are divided in the center. A first half shell 18 of the bearing seat 12 is formed here by the planetary carrier 9 and a second half shell 19 of the bearing seat 12 is formed by a bearing cap 20. The bearing cap 20 is designed such that together with the planetary carrier 9 it forms the bearing seats 12. The bearing cap 20 is preferably connected by means of a connecting element 21, such as a screw connection, to the planetary carrier 9.

Furthermore, it is possible that the bearing cap 20 comprises a recess 22 or an opening. As shown particularly clearly in FIG. 2 the recess 22 is provided to move the spur toothing 7 of the planetary gear 5 into engagement with the inner toothing 14 of the annular gear 13.

In a further, not shown embodiment variant, it is also possible for the bearing seat 12 of the first bearing accommodating section 10 and the bearing seat 12 of the second bearing accommodating section 11 to each have their own bearing cap 20.

Furthermore, it is shown in FIGS. 2 and 3 that a radial sliding bearing 23 can be provided which is inserted into the bearing seat 12. The radial sliding bearing 23 can be designed in this case in particular as a bearing bush 24. It is possible here for the bearing bush 24 to be mounted in the bearing seat 12 by means of clamping, the clamping being produced by the bearing cap 20, which forms the bearing seat 12 together with the planetary carrier 9. Furthermore, it is also possible for the bearing bush 24 to be stationary relative to the bearing seat 12 and for the planetary gear axle 8 to rotate relative to the bearing bush 24, wherein an inner casing surface 26 of the bearing bush 24 is designed as a sliding surface and can absorb the relative movement between the bearing bush 24 and planetary gear axle 8.

It is possible that the bearing bushes 24 are produced in a centrifugal casing method so that it has an even and smooth inner casing surface 26.

Alternatively, it is possible that the bearing bushes 24 are designed in the form of rolled bushes and comprise a butt joint 25. In this case the bearing bush 24 is preferably positioned in the bearing seat 12 so that the butt joint 25 does not lie in an area with high force on the bearing bush 24. Particularly, in an embodiment in which the bearing bush 24 is mounted securely in the bearing seat 12, the latter is loaded only locally with a radial force by the planetary gear axle 8, whereby in the region of the butt joint 25 no or only small bearing forces are absorbed.

Furthermore, it is possible for a recess to be formed in the planetary carrier 9 or in the bearing cap 20, into which recess the radial sliding bearing 23 can be placed so that the latter is mounted displaceably in the bearing seat 12 axially not opposite the latter.

Furthermore, it is possible that a cover fit 27 is formed in the planetary carrier 9 which corresponds with the bearing cap 20 so that the bearing cap 20 is centered on the planetary carrier 9 and thus the bearing seat 12 has the smoothest possible inner surface for mounting the radial sliding bearing 23.

Alternatively, it is also possible to provide fitting pins which ensure the precise positioning of the bearing cap 20 relative to the planetary carrier 9.

In another variant it is also possible that the radial sliding bearing 23 is designed as a divided sliding bearing half shell 28, wherein two of the sliding bearing half shells 28 together form the radial sliding bearing 23. In this case it is possible that the two sliding bearing half shells 28, which form the radial sliding bearing 23, have two different material compositions. Furthermore, it is also possible that the radial sliding bearing 23 is formed by a plurality of segments. In one embodiment of the radial sliding bearing 23 by means of sliding bearing half shells 28 or a plurality of segments it may be possible to position the individual sliding bearing half shells 28 so that a butt joint 25, in which two sliding bearing half shells 28 contact one another, is also arranged or is aligned in an area with low load. In other words, the partition plane of the sliding bearing half shells 28 cannot be congruent with the parting plane 17.

Preferably, the radial sliding bearings 23 are designed as multi-layered sliding bearings. A multi-layered sliding bearing comprises at least one support layer and at least one sliding layer, which is applied onto the support layer. The sliding layer thereby forms a running surface for the planetary carrier 9 or the planetary gear axle 8.

In addition to this two-layered embodiment of the multi-layered sliding bearing it is also possible to arrange intermediate layers between the sliding layer and the support layer, for example a bearing metal layer and/or at least one bonding layer and/or a diffusion barrier layer.

Examples of bearing metal layers include bearing metals with an aluminum base, bearing metals with a copper base, bearing metals with a tin base, etc.

Other bearing metals than the ones mentioned can also be used with a base of nickel, silver, iron or chrome alloys.

As also shown in FIG. 2, it is possible that an axial sliding bearing 29 is arranged respectively between the planetary gear 5 and the first bearing accommodating section 10 and between the planetary gear 5 and the second bearing accommodating section 11. The purpose of the axial sliding bearing 29 is that an end face 30 of the planetary gear 5 does not run onto the planetary carrier 9 or bearing cap 20.

As also shown, it is possible that the axial sliding bearing 29 is mounted in a corresponding mount 31 on the bearing cap 20 or on the planetary carrier 9. The axial sliding bearings 29 can hereby also be designed in the form of segments, so that the latter are secured for example only on the bearing cap 20 or only on the planetary carrier 9. In this case it is possible that the axial sliding bearing 29 is connected to the bearing cap 20 or to the planetary carrier 9 such that it is mounted by the latter and a relative movement takes place between the axial sliding bearing 29 and planetary gear 5.

Furthermore, it is also the case that as indicated in FIG. 3 the annular gear 13 has an annular gear segment 32 which is removable. In this way a planetary gear 5 can be removed together with the planetary gear axle 8 out of the planetary carrier 9, without having to take apart the whole planetary gear train 1. The annular gear segment 32, which also comprises the inner toothing 14, can be coupled by a screw connection to the rest of the annular gear 13. The annular gear segment 32 can be small in size, so that a planetary gear 5 together with the planetary gear axle 8 fits through the created opening. In an alternative variant it is also possible that the annular gear segment 32 forms a half shell of the annular gear 13.

The example embodiments show possible embodiment variants of the planetary gear train 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Furthermore, also individual features or combinations of features from the different shown and described embodiments can represent in themselves independent solutions according to the invention.

The problem addressed by the independent solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Mainly the individual embodiments shown in FIGS. 1, 2, 3 can form the subject matter of independent solutions according to the invention. The objectives and solutions according to the invention relating thereto can be taken from the detailed descriptions of these figures.

Finally, as a point of formality, it should be noted that for a better understanding of the structure of the planetary gear train 1, the latter and its components have not been represented true to scale in part and/or have been enlarged and/or reduced in size.

| | List of reference numerals |
|---|---|
| 1 | planetary gear train |
| 2 | central line planetary gear train |
| 3 | sun gear |
| 4 | shaft |
| 5 | planetary gear |
| 6 | spur gear toothing sun gear |
| 7 | spur gear toothing planetary gear |
| 8 | planetary gear axle |
| 9 | planetary carrier |
| 10 | first bearing accommodating section |
| 11 | second bearing accommodating section |
| 12 | bearing seat |
| 13 | annular gear |
| 14 | inner toothing |
| 15 | rotor shaft |
| 16 | central line planetary gear axle |
| 17 | parting plane |
| 18 | first half shell |
| 19 | second half shell |

-continued

| List of reference numerals | |
|---|---|
| 20 | bearing cap |
| 21 | connecting element |
| 22 | recess |
| 23 | radial sliding bearing |
| 24 | bearing bush |
| 25 | butt joint |
| 26 | inner casing surface |
| 27 | cover fit |
| 28 | sliding bearing half shell |
| 29 | axial sliding bearing |
| 30 | end face |
| 31 | mount axial sliding bearing |
| 32 | annular gear segment |

The invention claimed is:

1. A planetary gear train (1) for a wind turbine, comprising:
  a sun gear (3),
  an annular gear (13),
  a planetary carrier (9) with a first bearing accommodating section (10) and a second bearing accommodating section (11),
  a plurality of bearing seats (12),
  a plurality of planetary gear axles (8),
  a plurality of radial sliding bearings (23) for supporting the planetary gear axle (8) in the planetary carrier (9), wherein each of the planetary gear axles (8) are mounted respectively in one of the bearing seats (12) of the first bearing accommodating section (10) and in one of the bearing seats (12) of the second bearing accommodating section (11), and
  a plurality of planetary gears (5), which are mounted respectively by the planetary gear axles (8) in the planetary carrier (9), wherein the planetary gears (5) are in engagement both with the sun gear (3) and also with the annular gear (13),
  wherein the planetary carrier (9) has a parting plane (17) in the region of the bearing seats (12), wherein a first half shell (18) of one of the bearing seats (12) is formed by the planetary carrier (9) and a second half shell (19) of one of the bearing seats (12) is formed by a bearing cap (20) respectively and
  wherein one of the radial sliding bearings (23) is designed as a bearing bush (24), wherein the bearing bush (24) is mounted securely in one of the bearing seats (12), and wherein an inner casing surface (26) of the bearing bush (24) is designed for receiving a relative movement between the bearing bush (24) and one of the planetary gear axles (8), the bearing bush (24) being mounted in the bearing seat (12) by a clamping, the clamping being produced by the bearing cap (20) which forms the bearing seat (12) together with the planetary carrier (9).

2. The planetary gear train as claimed in claim 1, wherein one of the bearing caps (20) is designed such that it extends over one of the bearing seats (12) of the first bearing accommodating section (10) and the respectively associated bearing seat (12) of the second bearing accommodating section (11).

3. The planetary gear train as claimed in claim 1, wherein one of the bearing caps (20) has a recess (22), through which one of the planetary gears (5) penetrates at least partly.

4. The planetary gear train as claimed in claim 1, wherein one of the radial sliding bearings (23) is designed as a divided sliding bearing half shell (28).

5. The planetary gear train as claimed in claim 1, wherein one of the planetary gear axles (8) is designed in one piece with one of the planetary gears (5).

6. The planetary gear train as claimed in claim 1, wherein one of the bearing caps (20) is connected by a plurality of connecting elements (21) to a main body of the planetary carrier (9).

7. The planetary gear train as claimed in claim 1, wherein an axial sliding bearing (29) is arranged respectively between the end faces (30) of one of the planetary gears (5) and the planetary carrier (9).

8. A wind turbine comprising a rotor and a generator, wherein between the rotor and the generator a planetary gear train (1) is arranged which is in operative connection with the rotor and the generator, wherein the planetary gear train (1) is designed as claimed in claim 1.

* * * * *